(12) United States Patent
Pandey (10) Patent No.: US 11,216,642 B2
(45) Date of Patent: Jan. 4, 2022

(54) SIMULTANEOUS MULTI-FACTOR AUTHENTICATION SYSTEMS AND METHODS FOR PAYMENT TRANSACTIONS

(71) Applicant: MASTERCARD INTERNATIONAL INCORPORATED, Purchase, NY (US)

(72) Inventor: Anshul Pandey, White Plains, NY (US)

(73) Assignee: Mastercard International Incorporated, Purchase, NY (US)

( * ) Notice: Subject to any disclaimer, the term of this patent is extended or adjusted under 35 U.S.C. 154(b) by 100 days.

(21) Appl. No.: 16/410,175

(22) Filed: May 13, 2019

(65) Prior Publication Data

US 2019/0272546 A1 Sep. 5, 2019

Related U.S. Application Data

(62) Division of application No. 14/795,058, filed on Jul. 9, 2015, now abandoned.

(51) Int. Cl.
| | |
|---|---|
| *G06K 9/00* | (2006.01) |
| *G06Q 20/40* | (2012.01) |
| *G06F 3/0354* | (2013.01) |
| *G06F 3/0488* | (2013.01) |
| *G06F 21/00* | (2013.01) |
| *G06F 3/00* | (2006.01) |

(52) U.S. Cl.
CPC .......... *G06K 9/00154* (2013.01); *G06F 3/00* (2013.01); *G06F 3/03545* (2013.01); *G06F 3/04883* (2013.01); *G06F 21/00* (2013.01); *G06Q 20/40145* (2013.01)

(58) Field of Classification Search
CPC ........... G06K 9/00154; G06F 3/03545; G06F 3/04883; G06F 21/00
See application file for complete search history.

(56) References Cited

U.S. PATENT DOCUMENTS

| | | | | |
|---|---|---|---|---|
| 7,433,499 B2* | 10/2008 | Kim | ...................... | G07C 9/247 382/119 |
| 2013/0239787 A1* | 9/2013 | McMillen | ................. | G06F 1/16 84/643 |
| 2014/0183269 A1* | 7/2014 | Glaser | ................... | G06F 3/0346 235/492 |
| 2015/0127550 A1* | 5/2015 | Khan | ................... | G06Q 20/382 705/71 |
| 2015/0317637 A1* | 11/2015 | Kuribara | ................ | G06Q 20/40 705/43 |

* cited by examiner

*Primary Examiner* — Scott C Anderson
(74) *Attorney, Agent, or Firm* — Buckley, Maschoff & Talwalkar LLC (57) ABSTRACT

According to some embodiments, an authentication server may receive first and second biometric user data from a writing device. The writing device may, according to some embodiments, have a plurality of spatially alternating sensors, including a plurality of sensors of a first type to read the first biometric user data and a plurality of sensors of a second type to read the second biometric user data. The authentication server may also receive a user identifier input by the user via the writing device and verify that the first and second biometric user data are consistent with the user and that the user has a payment account associated with the user identifier input. The authentication server may then determine a payment identifier associated with payment account and transmit a payment authorization indication associated with the determined payment identifier.

10 Claims, 13 Drawing Sheets

| USER IDENTIFIER 802 | USER NAME 804 | PAYMENT ACCOUNT IDENTIFIER 806 | FIRST BIOMETRIC DATA 808 | SECOND BIOMETRIC DATA 810 |
|---|---|---|---|---|
| U_101 | MS. JONES | 1234-5678-9101 | FINGERPRINT | PALM PRINT |
| U_102 | MR. SMITH | 4321-1234-5678 | FINGERPRINT | PRESSURE |
| U_103 | JOHN WEST | 8765-5678-1234 | POSITION | FINGERPRINT |
| U_104 | JANE GREENE | 5555-1111-9999 | FACE | VOICE |

FIG. 8

| USER IDENTIFIER 902 | PAYMENT ACCOUNT IDENTIFIER 904 | USER IDENTIFIER INPUT 906 |
|---|---|---|
| U_101 | 1234-5678-9101 | PASSWORD2020 |
| U_102 | 4321-1234-5678 | SIGNATURE.BMP |
| U_103 | 8765-5678-1234 | 12345 |
| U_104 | 5555-1111-9999 | DRAWING.JPG |

SIMULTANEOUS MULTI-FACTOR AUTHENTICATION SYSTEMS AND METHODS FOR PAYMENT TRANSACTIONS

CROSS-REFERENCE TO RELATED APPLICATIONS

The present application is a divisional patent application of U.S. patent application Ser. No. 14/795,058 entitled "SIMULTANEOUS MULTI-FACTOR AUTHENTICATION SYSTEMS AND METHODS FOR PAYMENT TRANSACTIONS" and filed Jul. 9, 2015 (pending). The entire content of that application is incorporated herein by reference.

BACKGROUND

People use payment accounts to facilitate transactions. For example, in some cases an account owner may insert a payment card (e.g., a credit card or debit card) into an Automated Teller Machine ("ATM"), enter his or her Personal Identification Number ("PIN"), and receive cash that he or she can then use to purchase items or services. In other cases, an account owner may present his or her payment card at a Point Of Sale ("POS") device (e.g., at a merchant's cash register) to purchase items or services.

Note that using a payment card at an ATM or POS device may be inconvenient for an account owner, such as an account owner who does not want to carry a wallet or purse. Moreover, a person other than the account owner may come into possession of the payment card (or even just a credit card number) and attempt to make a transaction using the owner's account (e.g., when the payment card is lost or stolen). Attempting to verify that a person is actually an account holder, can be an expensive, time-consuming, and error prone task for a merchant or online retailer (e.g., who may ask a person to enter a PIN and/or to present additional identification, such as a statue issued driver's license). This can be especially true when a substantial number of people (perhaps associated with many different card issuers) attempt a substantial number of transactions in many different locations. It would therefore be desirable to provide accurate and efficient systems and methods to identify an account owner when he or she attempts to make a transaction using a payment account.

DETAILED DESCRIPTION

Figure 1:
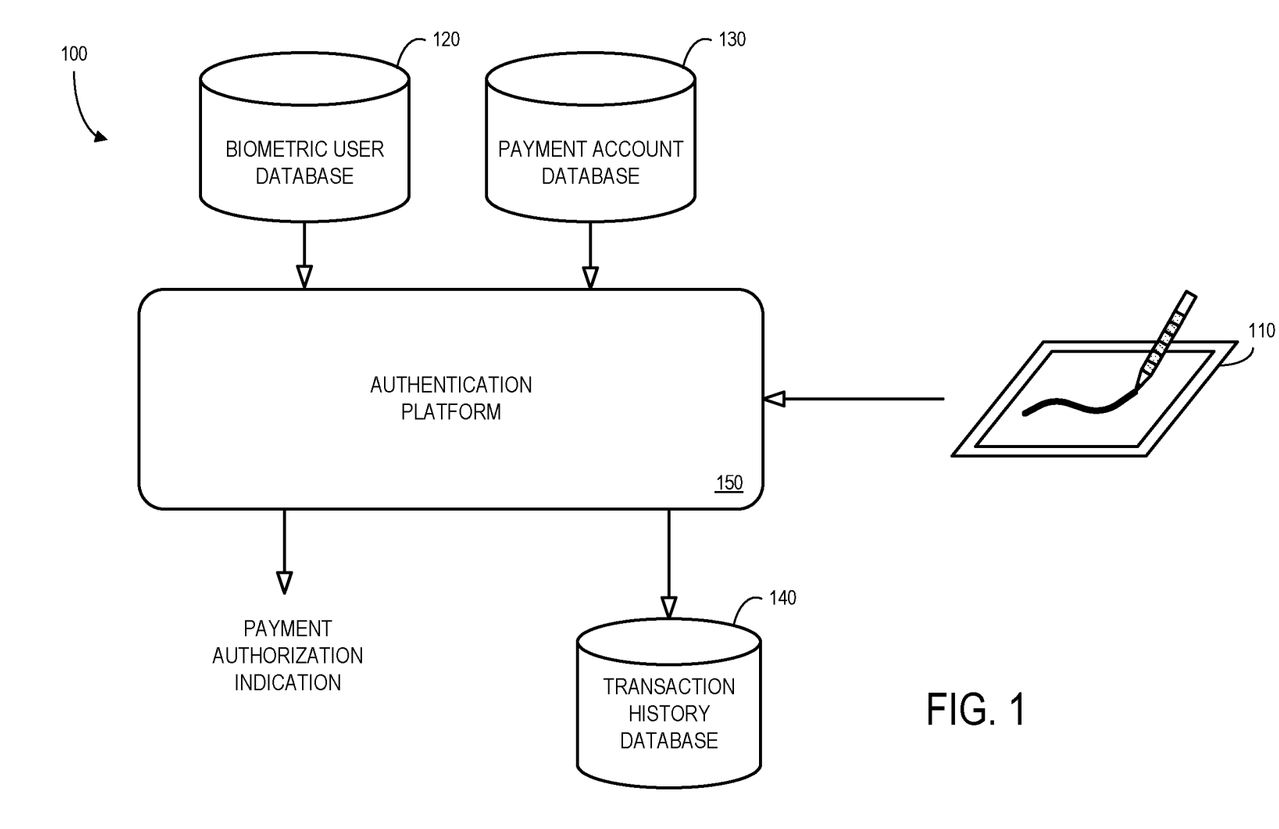
FIG. 1 is a block diagram overview of a system according to some embodiments of the present invention.

In some cases an account owner may insert a payment card (e.g., a credit card or debit card) into an ATM, enter his or her PIN, and receive cash that he or she can then use to purchase items or services. In other cases, an account owner may present his or her payment card at a POS device to purchase items or services. Note that using a payment card at a POS device may be inconvenient for some account owners. It would therefore be desirable to provide accurate and efficient systems and methods to identify an account owner when he or she attempts to make a transaction using a payment account. FIG. 1 is block diagram of a system 100 according to some embodiments of the present invention. In particular, the system 100 includes an authentication platform 150 that receives information from a POS or ATM device 110.

The authentication platform 150 might be, for example, associated with a Personal Computer (PC), laptop computer, an enterprise server, a server farm, and/or a database or similar storage devices. The authentication platform 150 may, according to some embodiments, be associated with a credit card company.

According to some embodiments, an "automated" authentication platform 150 may identify an account owner when he or she attempts to make a transaction using a payment account. For example, the authentication platform 150 may automatically output a payment authorization indication to the POS device or to any other party (e.g., a credit card issuer). As used herein, the term "automated" may refer to, for example, actions that can be performed with little (or no) intervention by a human.

As used herein, devices, including those associated with the authentication platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN, and/or an Internet Protocol (IP) network such as the Internet, an intranet, or an extranet. Note that any devices described herein may communicate via one or more such communication networks.

The authentication platform 150 may retrieve data from a biometric user database 120 and/or a payment account database 130. The payment account database 130 might be associated with, for example, payment accounts, such as credit card or bank accounts. The biometric user database 120 and the payment account database 130 may be locally stored or reside remote from the authentication platform 150. As will be described further below, the biometric user database 120 and payment account database 130 may be used by the authentication platform 150 to generate a payment authorization message. According to some embodiments, the authentication platform 150 communicates information to an external device, such as by transmitting an electronic file to an email server, a workflow management system, POS device, etc. In other embodiments, the authentication platform 150 might store transaction information in a transaction history database 170.

Although a single authentication platform 150 is shown in FIG. 1, any number of such devices may be included. Moreover, various devices described herein might be combined according to embodiments of the present invention. For example, in some embodiments, the authentication platform 150, biometric user database 120 and/or payment account database 130 might be co-located and/or may comprise a single apparatus.

In accordance with some embodiments, the systems and methods described herein provide a framework to identify people who attempt to make ATM and/or POS transactions based on biometric information and information associated with payment accounts. By way of example, and without limiting the generality of the foregoing, a payment card can be a credit card, debit card, charge card, stored-value card, or prepaid card or nearly any other type of financial transaction card. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction" can be associated with, for example, a merchant, a merchant terminal, an ATM, an online sale, or any other suitable institution or device configured to initiate a financial transaction per the request of the account owner.

The information in the payment account database 130 may be associated with, for example, a "payment card processing system" or "credit card processing networks," such as the MasterCard® network that allows account owners to use payment cards issued by a variety of issuers to shop at a variety of merchants. With this type of payment card, a card issuer or attribute provider, such as a bank, extends credit to an account owner to purchase products or services. When an account owner makes a purchase from an approved merchant, or withdraws funds via an ATM, the card number and amount of the purchase, along with other relevant information, are transmitted via the processing network to a processing center, which verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases or cash withdrawals, generally on a monthly basis.

The payment account database 130 may further store a "business classification," which is a group of merchants and/or businesses, by the type of goods and/or service the merchant and/or business provides. For example, the group of merchants and/or businesses can include merchants and/or business, which provide similar goods and/or services. In addition, the merchants and/or businesses can be classified based on geographical location, sales, and any other type of classification, which can be used to associate a merchant and/or business with similar goods, services, locations, economic and/or business sector, industry and/or industry group. According to some embodiments, different business classifications may be associated with different biometric standards.

The payment account database 130 may also store a "merchant category code" or "MCC," which is a four-digit number created by MasterCard® or VISA® and assigned to a business by the acquirer when the business first starts accepting one of these cards as a form of payment. The MCC is used to classify the business by the type of goods or services it provides. For example, in the United States, the merchant category code can be used to determine if a payment needs to be reported to the IRS for tax purposes. In addition, MCCs are used by card issuers to categorize, track or restrict certain types of purchases. According to some embodiments, different MCCs may be associated with different biometric standards.

In accordance with some embodiments, data associated with payment card transactions is stored within the payment account database 130. The data may include, for example, a listing of sales amount for each payment card transaction including the type of goods and/or services sold, a total number of goods and/or services sold in each transaction, a total sales amount for each transaction (e.g., gross dollar amount), biometric information about the account owner, etc. In addition, for each merchant and/or business, the data associated with each transaction may include a point-of-sale or point-of-purchase (e.g., location of each payment card transaction). The point-of-sale or point-of-purchase provides that for merchants and/or businesses having one or more locations, the location of the merchant and/or business, which generated the sale can be identified.

Figure 2:
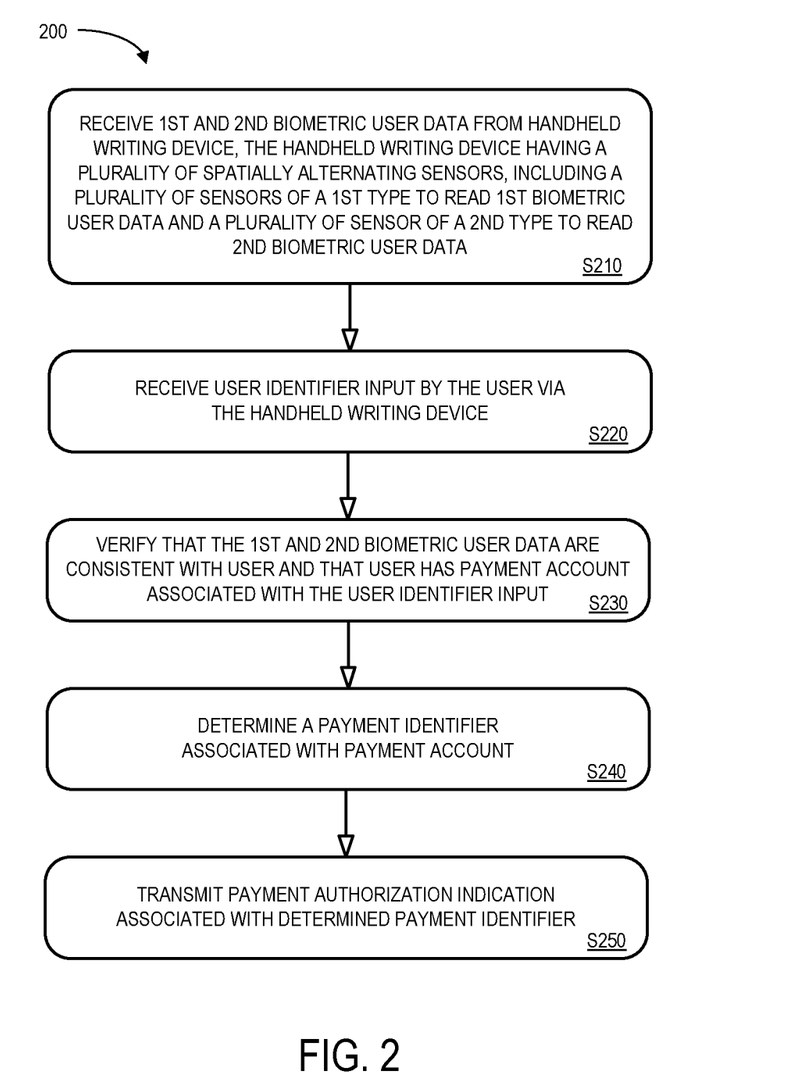
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an authentication server may receive first and second biometric user data from a writing device. According to some embodiments, the first biometric user data is fingerprint information and the second biometric user data is palm vein sensor information. As used herein, the phrase "writing device" or writing device" might refer to a POS device, a pen, a touchscreen, a computer mouse, and/or a television controller.

Note that other biometric information might be received instead of, or in addition to, fingerprint and/or palm vein data. For example, a writing device and/or touchscreen might measure an amount of pressure that a person applies when he or she is writing (and/or a pattern of pressure variations). This information can then be used to verify that the pressure information matches how the person usually writes (e.g., as previously recording during a registration process). Similarly, a writing device and/or touchscreen might measure a position indicating how a person holds a pen when he or she is writing (and/or angles, motions, velocities, etc. associated with the pen's position). This information can then be used to verify that the position information matches how the person usually writes (e.g., as previously recording during a registration process). Other type of information that might be used to authenticate an account older include: facial information (e.g., as received from a photographic or thermal camera at the POS device), retina information, DNA information, palm print data, hand geometry information, iris recognition, and/or voice data.

At S220, the authentication server may receive a user identifier input by the user via the writing device. As used herein, the phrase "user identifier" might refer to, for example, a Personal Identification Number ("PIN"), a signature, a password, and/or a drawing (e.g., a person might draw a simple flower shape during a registration process and indicate that will be his or her user identifier).

At S230, the authentication server may verify that the first and second biometric user data are consistent with the user and that the user has a payment account associated with the user identifier input. At S240, a payment identifier associated with payment account may be determined. The payment account may be associated with, for example, a credit card account, a debit card account, a bank account, or a pre-paid card account. At S250, a payment authorization indication associated with the determined payment identifier may be transmitted (e.g., to a POS device, issuing bank, or any other institution associated with the transaction).

Figure 3:
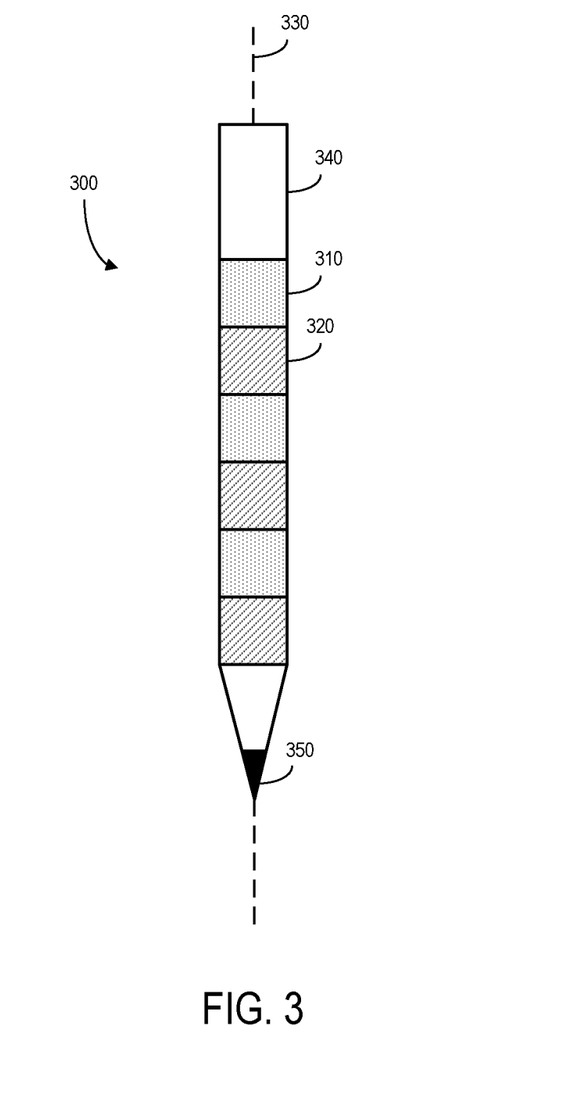
FIG. 3 illustrates a writing device according to some embodiments.

FIG. 3 illustrates a writing device or device 300 according to some embodiments. The writing device 300 might be associated with a POS device, a pen, a touchscreen, a computer mouse, and/or a television controller. According to some embodiments, the writing device 300 has a plurality of spatially alternating sensors 310, 320, including a plurality of sensors of a first type 310 to read first biometric user data (e.g., fingerprint information) and a plurality of sensors of a second type 320 to read second biometric user data (e.g., palm vein information).

According to some embodiments, the first biometric user data comprises fingerprint information. Note that the ridges of a human finger are detailed, unique, difficult to alter, and durable over the life of an individual—which makes them suitable as a long-term marker of human identity. Fingerprint identification, known as dactyloscopy, is the process of comparing two instances of ridge skin patterns to determine whether the impressions came from the same individual (e.g., one from an electronic sensor 310 of the pen 300 and one collected and stored during a registration process). Because no two finger or palm prints are ever exactly alike in every detail, an expert computer system may use threshold scoring rules to determine whether two ridge patterns are likely to have originated from the same finger.

According to some embodiments, the second biometric user data is associated with "palm vein biometrics." Note that the pattern of blood veins in person's palm is unique to every individual (even among identical twins). Moreover, palms have a broad, complicated vascular pattern and thus contain a wealth of differentiating features for personal identification. Furthermore, these patterns will not vary during a person's lifetime. As a result, it is a very secure method of authentication because this blood vein pattern lies under the skin (making it difficult for others to read or copy).

An individual's vein pattern image might be captured by having the sensors 320 in the pen 300 radiate the person's hand with near-infrared rays. The reflection method illuminates the palm using an infrared ray and captures the light given off by the region after diffusion through the palm. The deoxidized hemoglobin in the in the vein vessels absorb the infrared ray, thereby reducing the reflection rate and causing the veins to appear as a black pattern. This vein pattern is then verified against a preregistered pattern to authenticate the individual. As veins are internal in the body and have a wealth of differentiating features, attempts to forge an identity are extremely difficult, thereby enabling a high level of security. In addition, the sensors 320 of the palm vein device might only recognize the pattern when the deoxidized hemoglobin is actively flowing within the individual's veins. Note that such a sensor 320 is not dangerous; a near infrared is a component of sunlight (there is no more exposure when scanning a hand as compared to walking outside in the sun).

Further note that palm veins are inside the hand, and are therefore protected and less susceptible to minor trauma, cuts, etc. (as compared to some fingerprint systems). Also, the sensors 320 may be contactless, hygienic, non-invasive, and highly accurate (e.g., with a false rejection rate of 0.01% and false acceptance rate of 0.00008%).

Note that the multiple sensors 310, 320 alternate along the main axis 330 of the writing device 300. In this way, valuable information may be collected (e.g., partial fingerprint fragments) no matter how the person holds the pen 300. Note that some portions of the writing device 340 may not contain any sensors (e.g., instead housing a battery or being provided for ergonomic considerations). Moreover, additional sensors might be provided, such as a pressure sensor 350 at the tip of the writing device.

Figure 4:
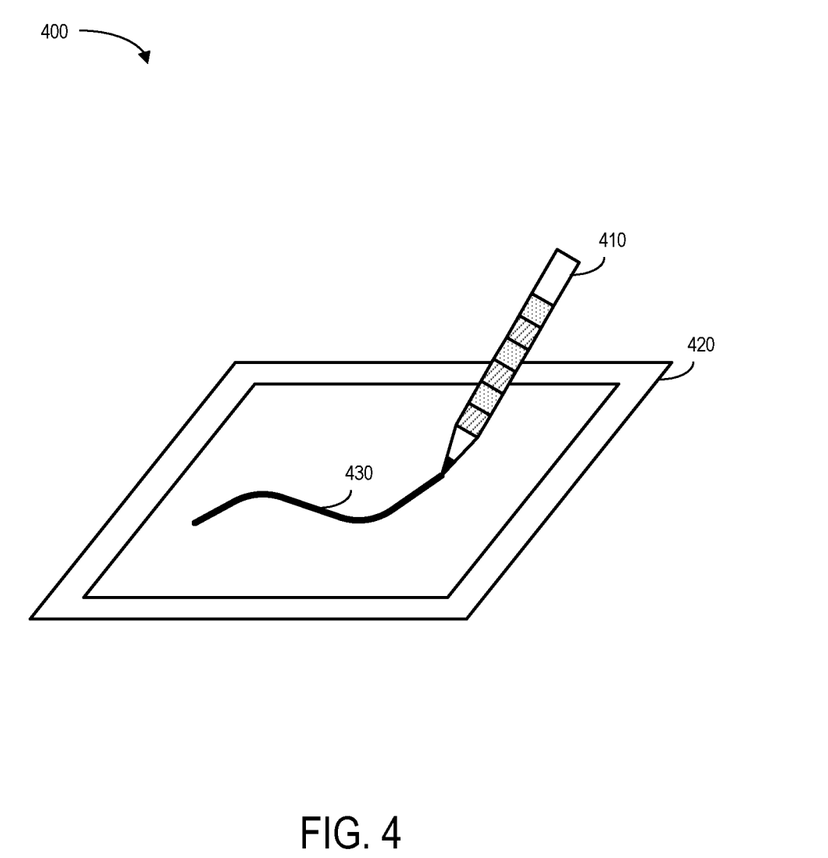
FIG. 4 illustrates a point of sale system according to some embodiments.

FIG. 4 illustrates a point of sale system 400 according to some embodiments. In this case, the user holds the pen 410 and writes on a touch screen 420 to form a mark 430. The mark 430 might be associated with, for example, the user's signature, his or her PIN, and/or any other pattern, password, or indication that was previously stored in connection with his or her payment account.

Figure 5:
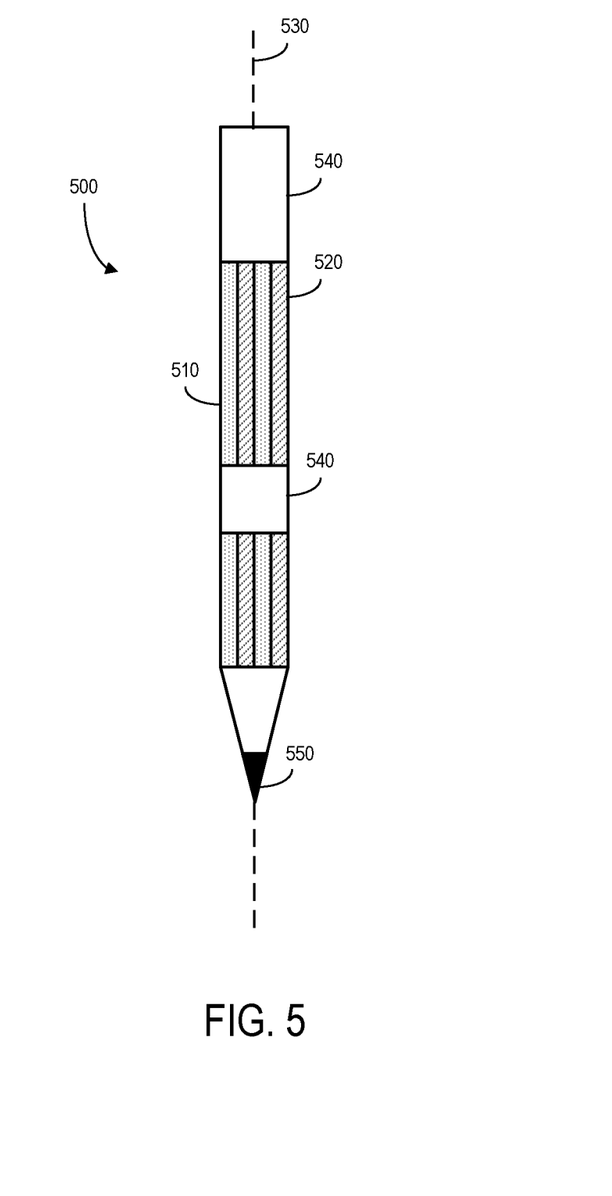
FIG. 5 illustrates a writing device according to another embodiment.

Note that other writing device configurations might be provided. For example, FIG. 5 illustrates a writing device 500 according to another embodiment. As before, the writing device 500 has a plurality of spatially alternating sensors 510, 520, including a plurality of sensors of a first type 510 to read first biometric user data (e.g., fingerprint information) and a plurality of sensors of a second type 520 to read second biometric user data (e.g., palm vein information).

Note that the multiple sensors 510, 520 alternate in a fashion parallel to the main axis 530 (as compared to along the main axis 330 as in FIG. 3) of the writing device 500. This may still let the sensors 510, 520 collect valuable information (e.g., partial fingerprint fragments) no matter how the person holds the pen 500. Note that some portions of the writing device 540 may not contain any sensors (e.g., instead housing a battery or being provided for ergonomic considerations) and additional sensors might be provided, such as a pressure sensor 550 at the tip of the writing device. Note that in some embodiments, the pressure is instead sensed by a touchscreen or pad (instead of the pen 500).

Figure 6:
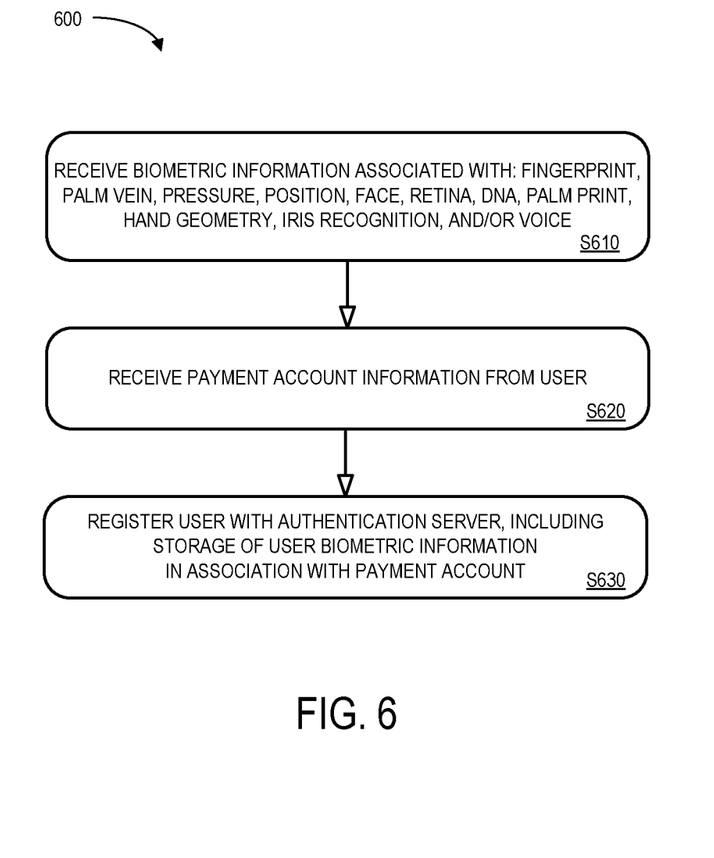
FIG. 6 illustrates a registration method that might be performed in accordance with some embodiments.

According to some embodiments, a person may register with the authentication server, providing user biometric information in association with a payment account, prior to using the writing device 500 to complete a transaction. For example, FIG. 6 illustrates a registration method 600 that might be performed in accordance with some embodiments.

At S610, the authentication platform receives biometric information from the user. For example, the user might be asked to sign his or her name five times (e.g., to provide a good sample of various pen positions, pressures, etc.). The biometric information might be associated with, for example, fingerprints, palm veins, pressure, position, face, retina, DNA, palm prints, hand geometry, iris patterns, and/or voice data. According to some embodiments, the biometric information collected during registration is updated as the user completes transaction (and more samples of his or her biometric information become available through normal use of the payment account). At S620, payment account information (e.g., a credit card number and associated PIN) may be received from the user and registration process may be completed at S630.

Figure 7:
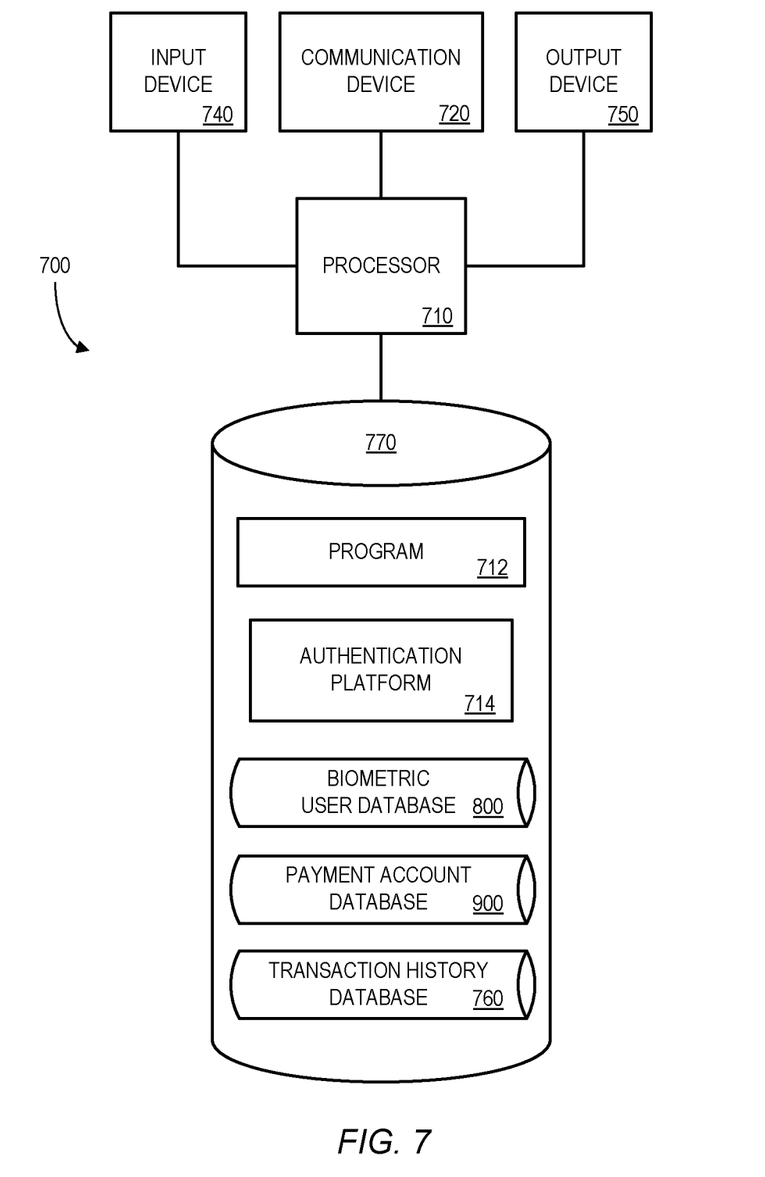
FIG. 7 is block diagram of an authentication tool or platform according to some embodiments of the present invention.

In this way, the authentication platform may collect and store information about a substantially number of users. Note that the embodiments described herein may be implemented using any number of different hardware configurations. For example, FIG. 7 illustrates an authentication platform 700 that may be, for example, associated with the system 100 of FIG. 1. The authentication platform 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more merchant or POS devices. The authentication platform 700 further includes an input device 740 (e.g., a computer mouse and/or keyboard to enter information about biometric information, such as fingerprint scoring threshold levels) and an output device 750 (e.g., a computer monitor or printer to output an account holder activity report).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or authentication platform logic 714 for controlling the processor 710. The processor 710 performs instructions of the programs 712, 714, and thereby operates in accordance with any of the embodiments described herein. For example, the processor 710 may receive first and second biometric user data from a writing device. The writing device may, according to some embodiments, have a plurality of spatially alternating sensors, including a plurality of sensors of a first type to read the first biometric user data and a plurality of sensors of a second type to read the second biometric user data. The processor 710 may also receive a user identifier input by the user via the writing device and verify that the first and second biometric user data are consistent with the user and that the user has a payment account associated with the user identifier input. The processor 710 may then determine a payment identifier associated with payment account and transmit a payment authorization indication associated with the determined payment identifier.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the authentication platform 700 from another device; or (ii) a software application or module within the authentication platform 700 from another software application, module, or any other source.

In some embodiments (such as shown in FIG. 7), the storage device 730 further stores a biometric user database 800, a payment account database 900, and a transaction history database 760. Some examples of databases that may be used in connection with the authentication platform 700 will now be described in detail with respect to FIGS. 8 and 9. Note that the databases described herein are only examples, and additional and/or different information may actually be stored therein. Moreover, various databases might be split or combined in accordance with any of the embodiments described herein. For example, the biometric user database 800 and/or the payment account database 900 might be combined, co-located, and/or linked to each other within the authentication platform 700.

Figure 8:
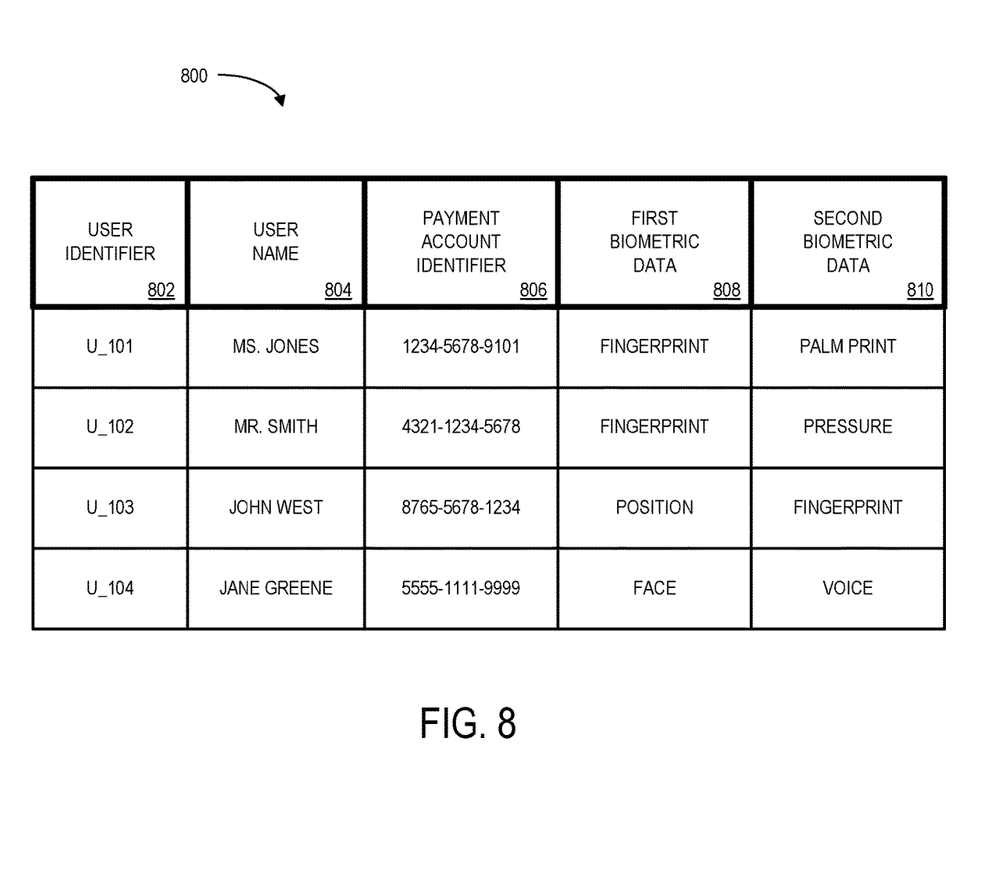
FIG. 8 is a tabular portion of a biometric user database according to some embodiments.

Referring to FIG. 8, a table is shown that represents the biometric user database 800 that may be stored at the authentication platform 700 according to some embodiments. The table may include, for example, entries identifying account owners who may want to make transactions via a payment account (e.g., credit card transactions). The table may also define fields 802, 804, 806, 808, 810 for each of the entries. The fields 802, 804, 806, 808, 810 may, according to some embodiments, specify: a user identifiers 802, a user name 804, a payment account identifier 806, first biometric data 808, and second biometric data 810. The biometric user database 800 may be created and updated, for example, based on information electrically received during a registration processes and/or as user's use their payment accounts.

The user 802 may be, for example, a unique alphanumeric code identifying an account owner and the user name 804 might comprise his or her legal name. The payment account 806 might comprise a credit card number, such as a Primary Account Number ("PAN"). The first and second biometric data 808, 8010 might comprise any information that can be used to verify the identity of the account owner (e.g., images of multiple fingerprint patterns).

Figure 9:
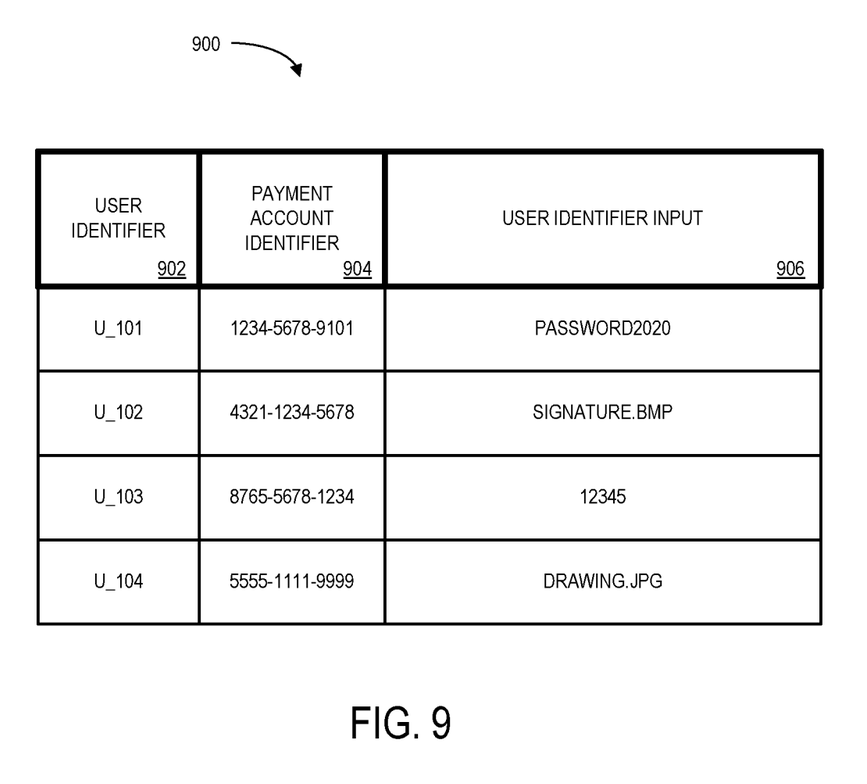
FIG. 9 is a tabular portion of a payment account database in accordance with some embodiments.

Referring to FIG. 9, a table is shown that represents the payment account database 900 that may be stored at the authentication platform 700 according to some embodiments. The table may include, for example, entries identifying account owners. The table may also define fields 902, 904, 906 for each of the entries. The fields 902, 904, 906 may, according to some embodiments, specify: a user identifier 902, a payment account identifier 904, and user identifier input 906. The payment account database 900 may be created and updated, for example, based on information electrically received when a user opens a credit card account and/or during a biometric verification registration process.

The user identifier 902 may be, for example, a unique alphanumeric code identifying an account owner and may, or may not, be based on or associated with the user identifier 802 in the biometric user database 800. The payment account identifier 904 may be, for example, a unique alphanumeric code identifying a payment account and may, or may not, be based on or associated with the payment account identifier 808 in the biometric user database 800. The user identifier input 906 might comprise, for example, an image of a signature, a PIN, a password, or any other type of information that a user might input during an authentication process.

Figure 10:
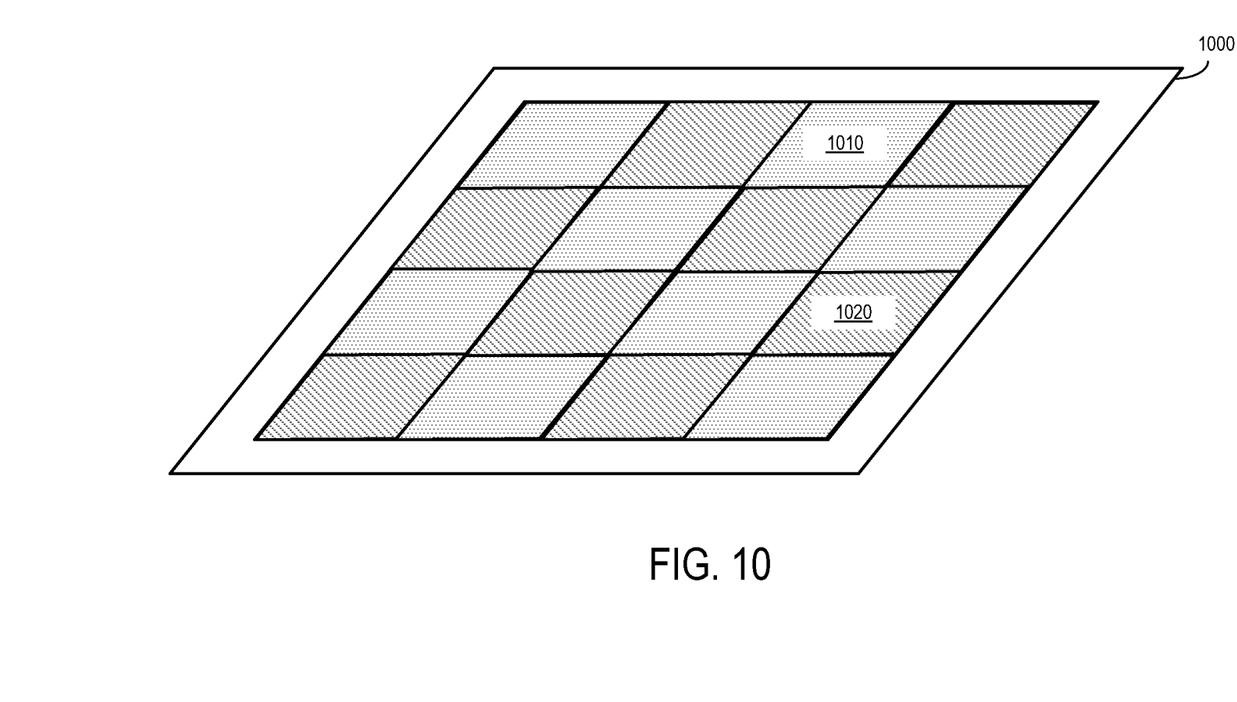
FIG. 10 illustrates a writing device according to some embodiments.

FIG. 10 illustrates a writing device 1000 according to some embodiments. In this case, a touchscreen might be used by an account holder to directly write with his or her finger (e.g., without holding a pen) when entering, for example, a payment account PIN or password. The writing device 1000 has a plurality of spatially alternating sensors 1010, 1020, including a plurality of sensors of a first type 1010 to read first biometric user data (e.g., fingerprint information) and a plurality of sensors of a second type 1020 to read second biometric user data (e.g., palm vein information). Note that the multiple sensors 1010, 1020 alternate in a fashion along a first and second axis of the writing device 1000. This may still let the sensors 1010, 1020 collect valuable information (e.g., partial fingerprint fragments) no matter where the person writes or draws. Note that some portions of the writing device 1040 may not contain any sensors (e.g., instead housing a battery or being provided for ergonomic considerations) and additional sensors might be provided, such as a pressure sensor at the tip of the writing device.

Figure 11:
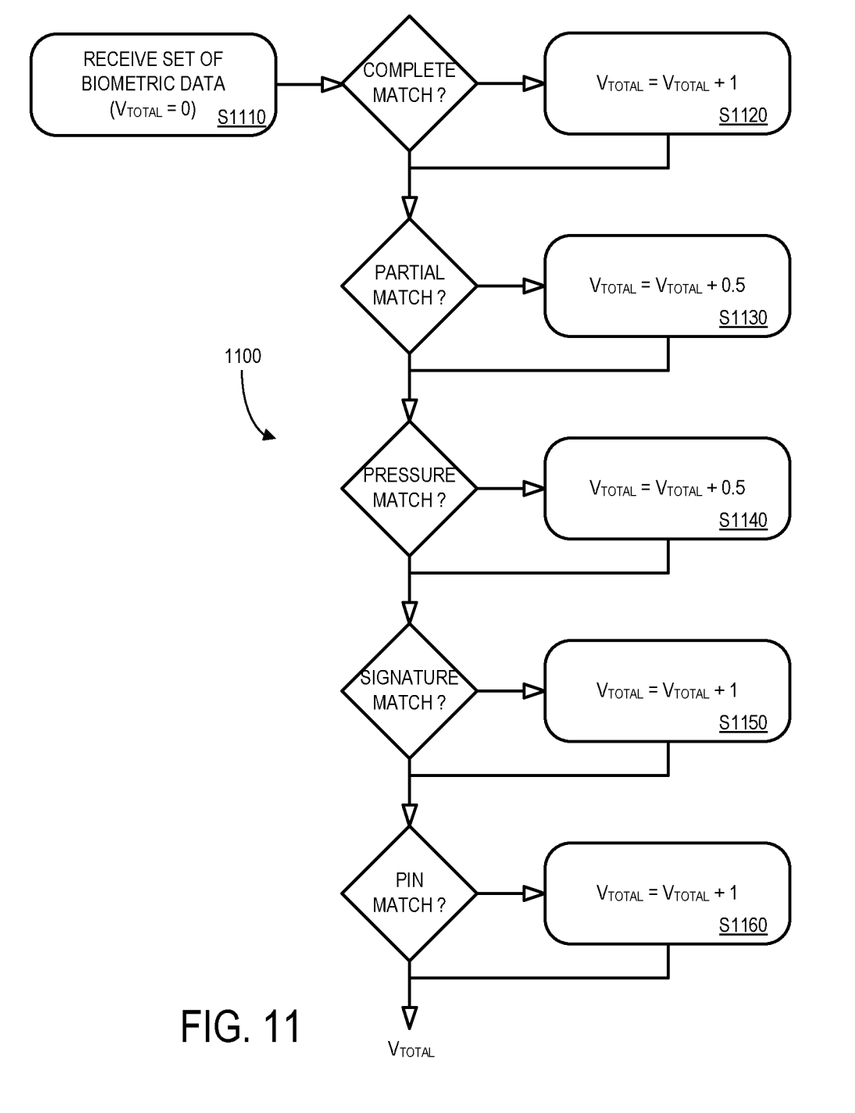
FIG. 11 illustrates an authentication method that might be performed in accordance with some embodiments.

Note that multiple factors, including biometric information, might be simultaneously evaluated by an authentication platform. FIG. 11 illustrates an authentication method 1100 that might be performed in accordance with some embodiments. At S1110, a set of biometric data may be received in connection with a POS transaction, and the system may initialize an overall validation value $V_{TOTAL}$ to zero. If the system determines that a complete biometric match is detected in the received data, $V_{TOTAL}$ is incremented by 1 at S1120. If the system instead determines that a partial biometric match is detected in the received data, $V_{TOTAL}$ is only incremented by 0.5 at S1130. If the system determines that the pressure used when writing a password or PIN is within a pre-determined threshold value of the account holder's usual pressure (e.g., within 10% of his or her average pressure), $V_{TOTAL}$ is incremented by 0.5 at S1140. If the system determines that a handwriting match of the account holder's signature detected in the received data, $V_{TOTAL}$ is incremented by 1 at S1150. If the system determines that entered PIN matches the account holder's PIN, $V_{TOTAL}$ is incremented by 1 at S1160. The system may then output a final $V_{TOTAL}$ and if the value is above a threshold value (e.g., 2.5), the transaction may be approved. In this way, different types of information can be given different weights in the authentication process. For example, it might be considered that a matching PIN is twice as important as a matching pressure value. Although values of "1" and "0.5" are illustrated in FIG. 11 for simplicity, actual embodiments might use any weighing factors. Moreover, the weighing factors might be automatically created, e.g. by a predictive model, and or be updated as the system collects actual biometric and transaction information. For example, the authentication platform might automatically detect that the way people hold pens is a much better indicator than previously thought when the system was originally designed. Further note that according to some embodiments the $V_{TOTAL}$ weights and values might be dependent on the user. For example, with certain users the system might be able to find a good match using biometric verification and a signature, while for other users a different combination might be more appropriate. According to some embodiments, the system starts with a set default value and weights for $V_{TOTAL}$ and these values may be adjusted over time as the system learns more about the user more and his or her way of holding the writing instrument, etc. According to still other embodiments, some of the weights and values might be determined based at least in part on the type of user accessing the service (e.g., one set of values might more accurately identify younger users as compared to older users).

Figure 12:
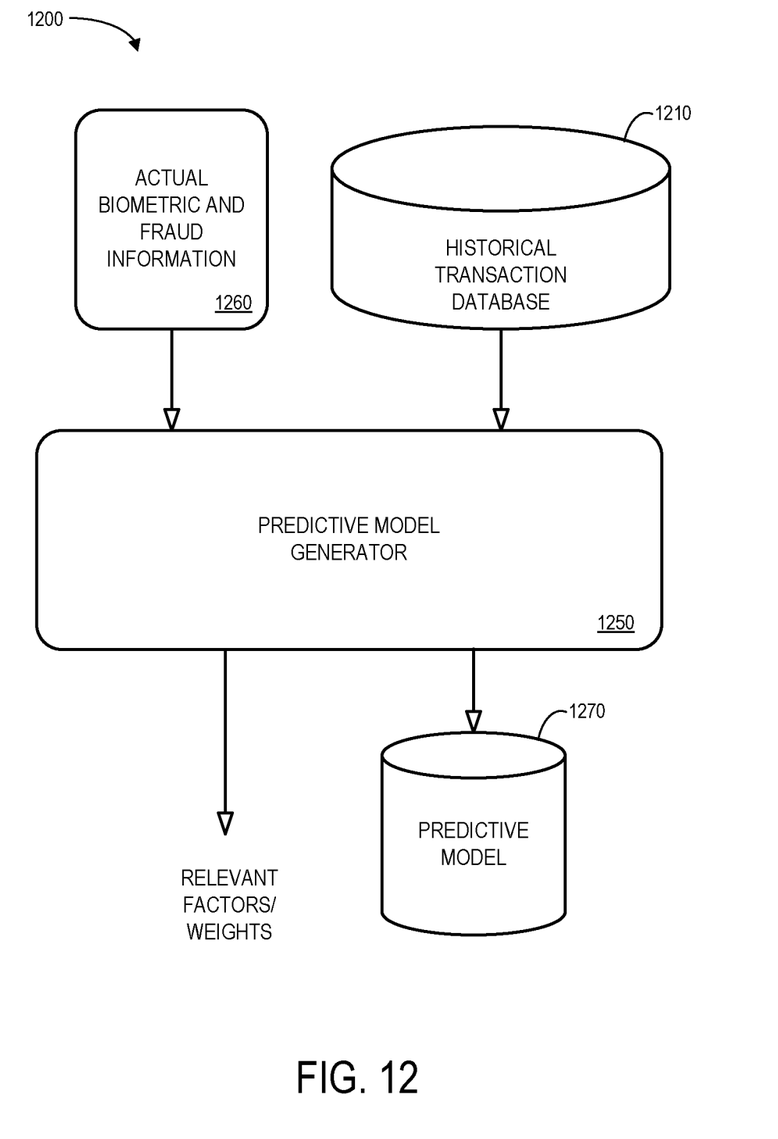
FIG. 12 is a block diagram of a system including a predictive model generator according to some embodiments.

Note that the rules and logic described with respect to FIG. 11 might be manually designed and constructed by a human operator. In some cases, however, relevant factors in a transaction database may be automatically identified and/or used to create a predictive model. For example, FIG. 12 is a block diagram of a system 1200 including a predictive model generator 1250 according to some embodiments. The predictive model generator 1250 may receive actual biometric and fraud information 1260 along with historical transaction database 1210 information (including, in some embodiments, demographic information, merchant codes, geographic information, etc.). For example, historical credit card purchases may be received along with indications of biometric values and fraud data for transactions of actual account holders over the past five years.

The predictive model generator 1250 may look for patterns in the historical transaction information to identify relevant factors and/or associated weights. For example, account owners who consistently hold pens in different ways might automatically be identified.

Figure 13:
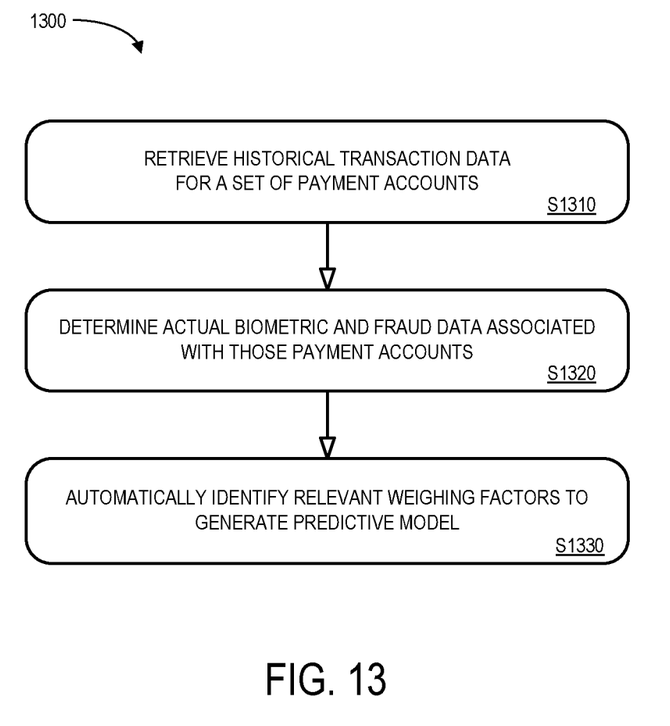
FIG. 13 is a flow chart illustrating how a predictive model might be generated according to some embodiments.

FIG. 13 is a flow chart illustrating how a predictive model might be generated according to some embodiments. At S1310, historical transaction data is retrieved from a set of payment accounts. Actual biometric and fraud information associated with those payment accounts is determined at S1320. The relevant factors in the historical transaction data may be automatically identified at S1330 and/or appropriate weighing values may be determined to generate or fine tune a predictive model.

Thus, according to some embodiments, authentication biometric data and/or behaviors may be based at least in part on rules created by a predictive model trained with historical transaction and/or biometric information. According to some embodiments, a predictive model utilizes different groupings associated with different sets and/or weights of relevant factors. For example, depending on high level grouping, different variables may be significant and/or relevant and the weightings of common variables may be different.

In general, and for the purposes of introducing concepts of embodiments of the present invention, a computer system may incorporate a "predictive model." As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model is trained with historical transaction information, and may be applied to current or test transactions to determine appropriate biometric thresholds and/or weighing factors.

The predictive model generator 1250 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein. The predictive model generator 1250, in various implementation, may include one or more of neural networks, Bayesian networks (such as Hidden Markov models), expert systems, decision trees, collections of decision trees, support vector machines, or other systems known in the art for addressing problems with large numbers of variables. According to some embodiments, the predictive model(s) are trained on prior data and biometric information known to the credit card company. The specific data and outcomes analyzed may vary depending on the desired functionality of the particular predictive model. The particular data parameters selected for analysis in the training process may be determined by using regression analysis and/or other statistical techniques known in the art for identifying relevant variables in multivariable systems.

Thus, according to some embodiments, an improved authentication platform might automatically approve transactions even when no payment card is present during a POS transaction. Moreover, embodiments might be also implemented for ATM transaction, online transactions, television transactions (e.g., biometric information might be collect when the user enters his or her PIN into a remote control unit), etc. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system, comprising:
    a writing device, including:
        a plurality of spatially alternating sensors, including a plurality of sensors of a first type to read first biometric user data and a plurality of sensors of a second type to read second biometric user data to be transmitted to a remote authentication server, wherein the sensors spatially alternate such that a sensor of the first type is physically located in-between two sensors of the second type;
    a biometric user database storing biometric data about a plurality of users;
    a payment account database storing payment account information about the plurality of users;
    an authentication communication port, remote from and in communication with the writing device, to receive: (i) the first and second biometric user data from the writing device, and (ii) a user identifier input by the user via the writing device; and
    an authentication server coupled to the biometric user database, the payment account database, and the authentication communication port, the authentication server including:
        a computer processor, and
        a computer memory storing instructions that when executed by the computer processor cause the computer processor to:
            (i) verify, based on information in the biometric user database, that the first and second biometric user data are consistent with the user and that the user has a payment account associated with the user identifier input,
            (ii) determine, based on information in the payment account database, a payment identifier associated with payment account, and
            (iii) transmit a payment authorization indication associated with the determined payment identifier.

2. The system of claim 1, wherein the writing device has a main axis and the sensors spatially alternate such that a sensor of the first type is physically located in-between two sensors of the second type in the direction of the main axis.

3. The system of claim 1, wherein the writing device has a main axis and the sensors spatially alternate such that a sensor of the first type is physically located in-between two sensors of the second type in a direction perpendicular to the main axis.

4. The system of claim 1, wherein the first biometric user data comprises fingerprint information and the second biometric user data comprises palm vein sensor information.

5. The system of claim 1, wherein one of the first and second biometric user information comprises: (i) facial information, (ii) retina information, (iii) DNA information, (iv) palm print data, (v) hand geometry information, (vi) iris recognition, and (vii) voice data.

6. The system of claim 1, wherein the writing device is associated with at least one of: (i) a point of sale device, (ii) a pen, (iii) a touchscreen, (iv) a computer mouse, and (v) a television controller.

7. The system of claim 1, wherein the payment account is associated with at least one of: (i) a credit card account, (ii) a debit card account, (iii) a bank account, and (iv) a pre-paid card account.

8. The system of claim 7, wherein the user identifier comprises at least one of: (i) a personal identification number, (ii) a signature, (iii) a password, and (iv) a drawing.

9. The system of claim 1, wherein the authentication server is further to receive pressure information associated with the writing device and verify that the pressure information is consistent with the user.

10. The system of claim 1, wherein the authentication server is further to receive position information associated with the writing device and verify that the position information is consistent with the user.

* * * * *